Figure 1:
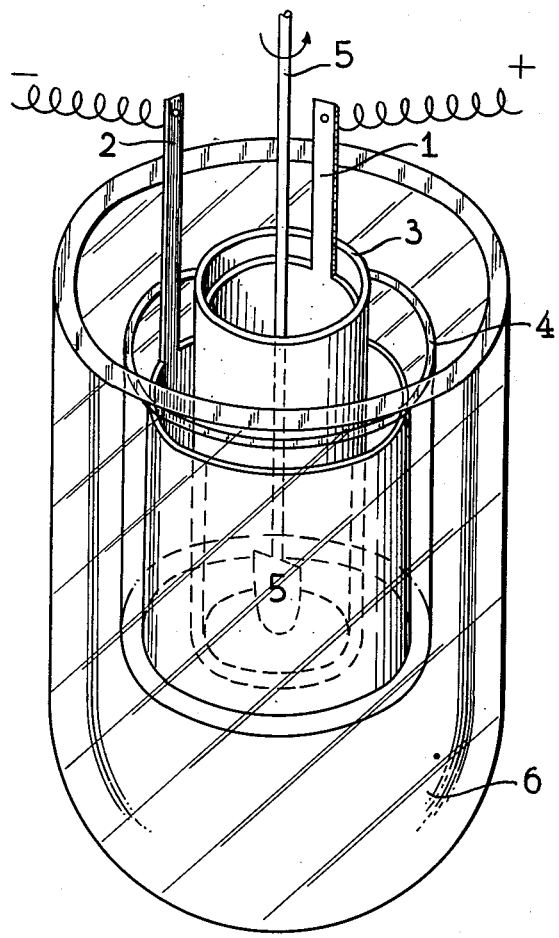

INVENTORS
WOLFGANG TESKE
ALBERT KRETTLER

United States Patent Office 3,063,920
Patented Nov. 13, 1962

3,063,920
PROCESS AND APPARATUS FOR PREPARING ALKALI METAL AZODISULFONATES
Wolfgang Teske, Bad Soden, Taunus, and Albert Krettler, Frankfurt am Main, Germany, assignors to Farbwerke Hoechst Aktiengesellschaft vormals Meister Lucius & Brüning, Frankfurt am Main, Germany, a corporation of Germany
Filed Apr. 27, 1959, Ser. No. 809,266
6 Claims. (Cl. 204—91)

The present invention relates to a process for the electrochemical preparation of alkali metal salts of azodisulfonic acid and to an apparatus for carrying out the process.

It is known that the compounds of azodisulfonic acid ($HSO_3N=NSO_3H$) are capable of accelerating polymerization (cf. for example U.S. Patent 2,468,111), potassium azodisulfonate being known as a compound that is especially capable of producing the aforesaid effect. This salt has hitherto been prepared by the method discovered by Konrad and Pellens when preparing the aforesaid salt for the first time (cf. Ber. Dtsch. Chem. Ges. 59, 135 (1926)). According to this method hydrazine sulfate is first converted by means of chlorosulfonic acid in the presence of pyridine into the pyridine salt of hydrazine disulfonic acid. This salt is precipitated by means of alcohol and subsequently oxidized in separate reaction by means of hypochlorite to yield azodisulfonate. Then potassium azodisulfonate is precipitated out with potassium chloride.

The aforesaid known process is a complicated process which comprises several stages and in which a number of auxiliary agents not belonging to the reaction proper are used. Moreover, the process necessitates the use of hydrazine sulfate which is an expensive substance.

The present invention provides a process for preparing alkali metal azodisulfonates, in which the disadvantages of the prior process are avoided. According to the new process alkali metal salts of aminosulfonic acid (i.e. sulfamic acid), for example the sodium salt or potassium salt of aminosulfonic acid, are anodically electrolyzed in an alkaline solution and thereby converted into the corresponding azodisulfonic acid salts. The process of the invention is advantageously carried out in one operation. As compared to the known method the process of the invention offers the considerable advance in industry that intermediary stages and operations can be dispensed with, that the use of substances not belonging to the reaction proper such as pyridine, hypochlorite and chlorosulfonic acid is avoided and that aminosulfonic acid which is less expensive than hydrazine sulfate is used as starting material. The process of the invention enables a large quantity of the alkali metal salts of azodisulfonic acid to be prepared continuously.

The alkali metal salts of azodisulfonic acid are immediately obtained in the anolyte in the form of a crystalline suspension and they can be isolated by a known method, for example by filtration or centrifugation.

The electrolysis is advantageously carried out in a cell provided with a diaphragm, a cooling device, a stirring means and platinum electrodes. The electrolysis may, for example, be carried out in a cell containing as diaphragm a cylinder shaped clay vessel in which a cylinder shaped platinum sheet anode, the stirrer of a stirring means and cooling coils serving to cool the anolyte are disposed. The cylinder shaped clay diaphragm is in the interior of a cylinder shaped electrolytic vessel which has, for example, been made of dense ceramic material. A patinum sheet cathode which is likewise cylinder shaped is disposed between the clay diaphragm and the cylinder shaped outer electrolytic vessel.

The process of the invention can advantageously be carried out in the following manner: Solutions containing about 0.1 to about 2 mols, preferably about 0.4 to about 1.2 mols of an alkali metal salt of aminosulfonic acid and about 3.5 to about 13 mols, preferably about 4 to about 6 mols of alkali liquor per liter of solution are anodically electrolyzed at a temperature within the range of about $-15°$ C. to about $+20°$ C., and preferably $-10°$ C. to $+5°$ C. The tension of current applied during the electrolysis is within the range of about 2 to about 5 volts. the strength of current is between about 1 and about 500 amperes and the density of current is between about 0.8 and about 100 amperes per square decimeter. The values to be chosen in a given case depend in particular on the structure and the dimensions of the apparatus in which the electrolysis is carried out and on the quantity of material put through. The values, in particular the density of current, depend furthermore on the residence time of the alkali metal azodisulfonate in the electrolyte. The residence time is advantageously as short as possible. The process of the invention can be applied with special advantage in cases in which the periods of residence are short. In these cases a current of a relatively great density, preferably a density of up to about 100 amperes per square decimeter is applied.

When carrying out the process of the invention it is advantageous to operate in such a manner that the alkali metal salts of azodisulfonic acid that have formed primarily separate in the form of crystals which are then mechanically, for example by filtration, separated from the anolyte. Alternatively, a part of the anolyte can continuously be cycled, the cycle being in part outside the cell, and the crystals of azodisulfonate that have formed can continuously be separated from the cycle by filtration and after replenishment of the alkali metal aminosulfonate consumed the electrolyte that has become poor in alkali metal aminosulfonate can be re-introduced into the cell.

When the periods of electrolysis are short the yields of material are considerably higher than in cases in which the periods of electrolysis are long for in the latter cases a part of the alkali metal azodisulfonates which readily undergoes decomposition decomposes whereby the yield is diminished.

Two modes of carrying out the process of the invention are shown diagrammatically and by way of example in the accompanying drawings.

Referring to the drawings, FIGURE 1 represents a cell suitable for use in carrying out the electrolysis according to the invention. The numeral 1 represents the platinum anode, 2 designates the cathode, 3 a clay diaphragm and 4 a glass vessel. The apparatus also comprises a stirrer 5. The apparatus is positioned in a Dewar vessel 6 containing a cooling bath.

Figure 2:
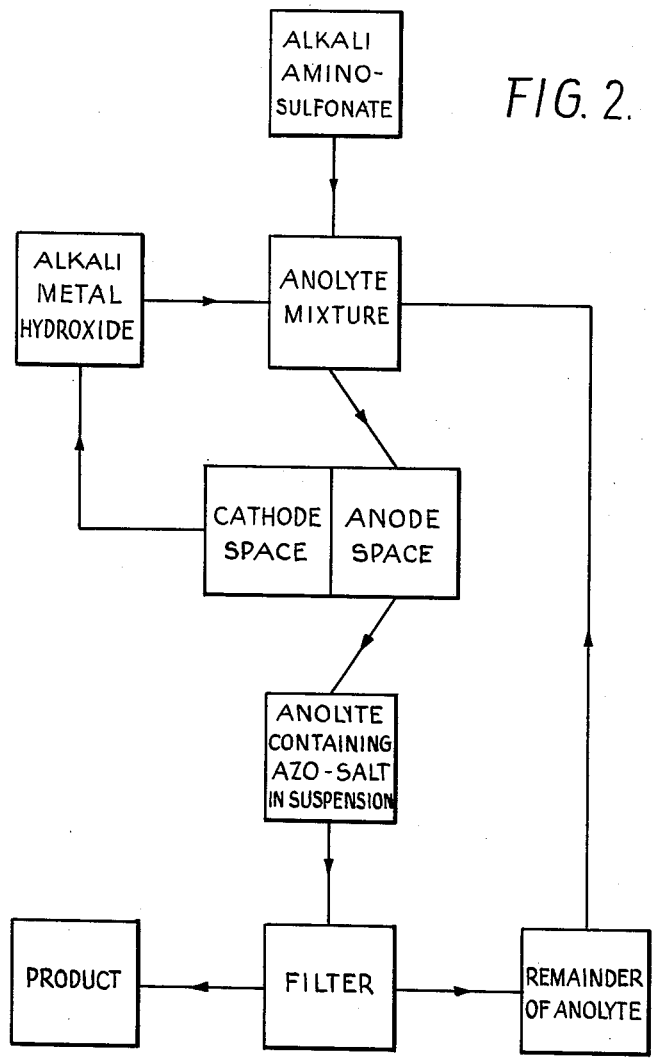

FIGURE 2 is a flow diagram which illustrates a mode of carrying out the process of the invention according to which a part of the anolyte is continuously conducted in a cycle outside the cell.

The following examples serve to illustrate the invention but they are not intended to limit it thereto:

EXAMPLE 1

*Preparation of Potassium Azodisulfonate From Potassium Aminosulfonate*

350 cc. of a mixture consisting of 240 cc. of a 1.95 molar solution of potassium aminosulfonate and 160 cc. of caustic potash solution of 50.6% strength are introduced as anolyte into a cylinder shaped clay vessel serving as diaphragm and having an internal height of 15 cm. and an internal diameter of 5.7 cm. This anolyte contains 1.175 mols of $NH_2SO_3K$ and 5.5 mols of KOH per liter of solution. The cylinder shaped clay vessel serving as diaphragm and separating the anode space from the cathode space and which is filled with the anolyte is positioned in a cylinder shaped glass vessel serving as outer electrolytic vessel and containing 420 cc. of 5.7 molar caustic potash solution serving as catholyte. In the middle of the clay vessel serving as diaphragm a cylinder shaped platinum sheet electrode having an active surface of 298 cm.$^2$ is disposed. As cathode there is used a cylinder shaped platinum sheet electrode which is installed between the cylindrical glass vessel and the cylindrical clay vessel serving as diaphragm and which has an active surface of 587 cm.$^2$. The stirrer of a small laboratory stirring apparatus dips into the clay vessel.

The electrolysis is brought about by a current having a strength of 6.0 amperes and a tension of 3.4 to 3.7 volts. Most of the time the tension is 3.6 volts. The density of current is 2.0 amperes per square decimeter. Immediately after the current has begun to pass through the cell the temperature of the anolyte which is stirred during the electrolysis is adjusted to 4° C. so that the temperature of the catholyte is within the range of —1 to 0° C. This regulation of temperature is brought about by means of a cold bath (solid carbon dioxide-acetone) contained in a Dewar vessel into which the whole electrolytic cell is placed. If larger electrolytic cells are used it is suitable to provide the anode space with cooling coils. After 2 hours of electrolysis 28.26 grams of $NH_2SO_3K$ are consumed and the concentration of KOH is 4.23 N in the anolyte and 5.52 N in the catholyte.

The anolyte and the precipitate that has formed in it are then passed through a glass suction filter. The precipitate is washed with methanol of —20° C. and then with acetone of —20° C. There are obtained 27.5 grams of final product. From a volumetric nitrogen analysis by way of hydrolytic decomposition of the analysis product it is calculated that the quantity of potassium azodisulfonate $N_2(SO_3K)_2$, that has formed amounts to 18.41 grams. The product separated from the anolyte contains 66.9% of potassium azodisulfonate. Hence it follows that the yield of material is 66.1% calculated on the potassium aminosulfonate consumed and the yield of current is 62% of the theoretical yield.

EXAMPLE 2

*Preparation of Sodium Azodisulfonate From Sodium Aminosulfonate*

The experiment is carried out in the same electrolytic cell as that described in Example 1. The anolyte is prepared by mixing 3 liters of a 1.98 molar solution of $NH_2SO_3Na$ with 2 liters of sodium hydroxide solution of 49.9% strength. 350 cc. of the resulting mixture which is 1.26 N with respect to its content of sodium aminosulfonate and 7.65 N with respect to its content of NaOH are introduced into the clay diaphragm. 350 cc. of 7.65 N sodium hydroxide solution serve as catholyte.

The strength of the current is adjusted to 6.0 amperes and the density of current is 2.0 amperes per square decimeter. The tension varies between 3.9 and 4.8 volts and most of the time it is 4.3 volts. After switching on the current the temperature of the anolyte is adjusted to —4° C. and it is allowed to be above or below that temperature by 1° C. The temperature prevailing in the catholyte is then about —10° C. After 2 hours of electrolysis a total of 22.92 grams of $NH_2SO_3Na$ is consumed in the anolyte, the concentration of NaOH is about 6.7 N in the anolyte and 7.36 N in the catholyte.

It is ascertained by examining the gaseous nitrogen set free by the action of acid and without isolating the sodium azodisulfonate that the anolyte contains 10.94 grams of finely crystalline $N_2(SO_3Na)_2$ that has formed and precipitated. The yield of material accordingly amounts to 48.6% and that of current to 42% of the theoretical yield.

We claim:

1. A process for preparing alkali metal salts of azodisulfonic acid which comprises electrochemically oxidizing alkali metal salts of aminosulfonic acid in an alkaline anolyte solution at a platinum anode, whereby said azodisulfonic acid salts are formed, and separating said azodisulfonic acid salts from said anolyte.

2. A process as in claim 1 wherein said anolyte solution comprises about 0.1 to about 2 mols of said aminosulfonic acid salts and about 3.5 to about 13 moles of alkali per liter.

3. A process as in claim 2 wherein said anolyte solution is electrolyzed at a temperature between about —15° C. to about +20° C.

4. A process as in claim 1 wherein said aminosulfonic acid salts are electrolyzed at a current density between about 0.8 and about 100 amperes per square decimeter.

5. A continuous process for preparing alkali metal salts of azodisulfonic acid which comprises electrochemically oxidizing alkali metal salts of aminosulfonic acid in an alkaline anolyte solution at a platinum electrode in an electrolytic cell, whereby said azodisulfonic acid salts are formed, continuously removing a portion of said anolyte from the cell and separating said azodisulfonic acid salts therefrom, replenishing in the anolyte the aminosulfonic acid salts consumed from the anolyte by said oxidation, and returning the replenished anolyte to the cell.

6. A process as in claim 5 wherein said azodisulfonic acid salts are separated from said anolyte by filtration.

References Cited in the file of this patent

UNITED STATES PATENTS

| | | |
|---|---|---|
| 1,388,216 | Thatcher | Aug. 23, 1921 |
| 1,926,591 | Loddesol | Sept. 12, 1933 |
| 2,110,273 | McKee et al. | Mar. 8, 1938 |
| 2,538,317 | Mason et al. | Jan. 16, 1951 |
| 2,713,553 | Mehltretter | July 19, 1955 |
| 2,713,576 | Benneville | July 19, 1955 |
| 2,746,916 | Magariello | May 22, 1956 |